May 22, 1951  E. R. PRICE  2,554,312
FORCE TRANSMITTING MECHANISM
Filed June 18, 1947  2 Sheets-Sheet 1

INVENTOR.
EARL R. PRICE
BY
ATTORNEY

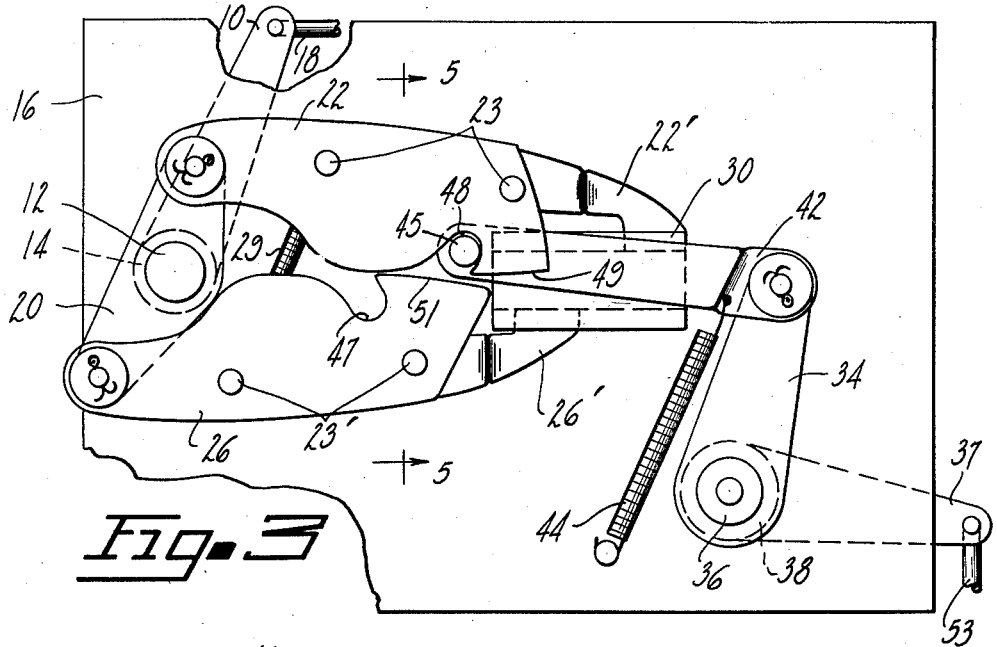
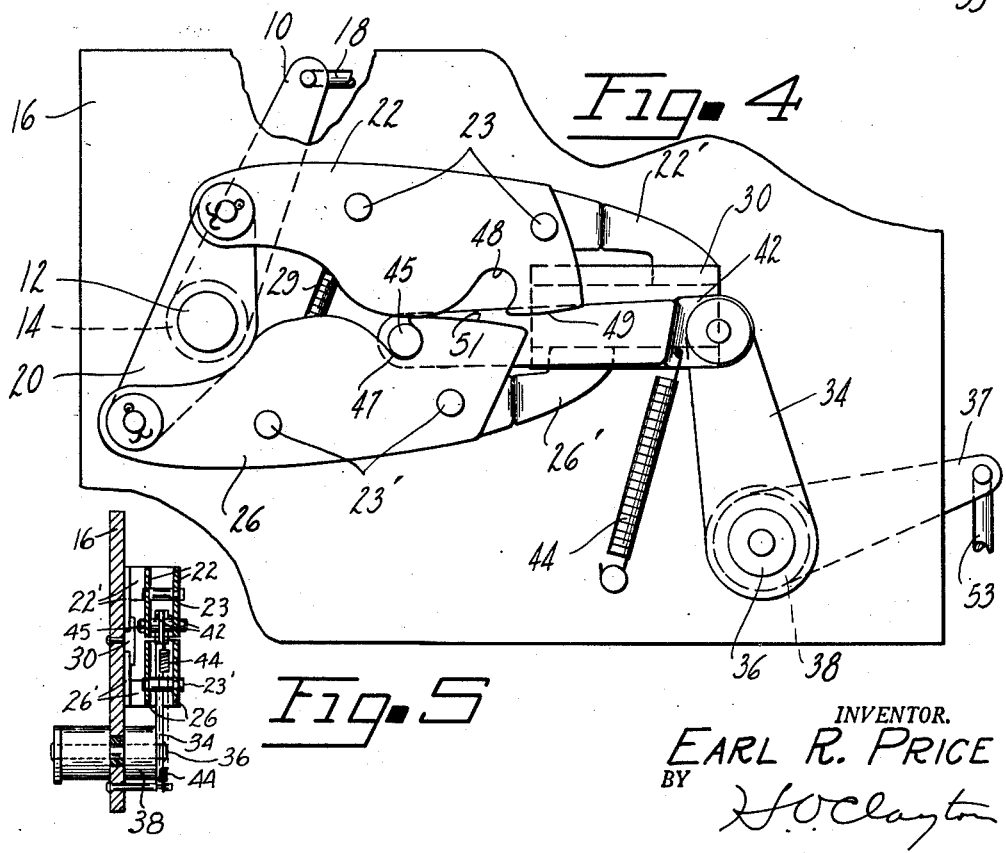
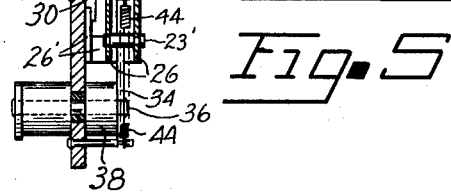

Patented May 22, 1951

2,554,312

UNITED STATES PATENT OFFICE 2,554,312

FORCE TRANSMITTING MECHANISM

Earl R. Price, South Bend, Ind., assignor to Bendix Aviation Corporation, South Bend, Ind., a corporation of Delaware Application June 18, 1947, Serial No. 755,299

3 Claims. (Cl. 74—96)

This invention has to do with a force transmitting mechanism and is well adapted for use as a part of the transmission operating mechanism of an automotive vehicle, particularly a transmission operating mechanism of the type disclosed in Price application No. 642,240, filed January 19, 1946.

An object of my invention is to provide a reliable, compact and cheaply manufactured alternator, that is, direction changing mechanism, adapted for use in a transmission operating mechanism; and it is a further object of my invention to so construct said alternator as to reduce any binding of the parts of the unit when in operation and reduce the bearing loads of the unit.

Yet another object of my invention is to provide a simple and effective alternator mechanism including an input lever and an output lever and means interconnecting said levers whereby with successive angular rotations of the input lever in one direction there is effected an oscillatory movement of the output lever; and another object of my invention is to so construct and arrange the parts of said mechanism that with successive angular movements of the input lever in the other direction there is effected a preselecting operation of the mechanism.

A further object of my invention is to provide an alternator mechanism including an input lever and an output lever and means, including tension members connected to said levers, for effecting an oscillatory angular movement of the output lever with successive angular rotations of the input lever.

The above and other objects and features of the invention will appear more fully hereinafter from a consideration of the following description taken in connection with the accompanying drawings wherein an embodiment of the invention is illustrated by way of example.

Figure 3 is a view disclosing the parts of the mechanism of my invention in the positions assumed after the output lever has been moved to its other operative position;

Figure 4 is another view of the parts of the alternator mechanism constituting my invention, the input lever having been again moved to effect a preselecting operation; and Figure 5 is a sectional view of the alternator mechanism of my invention, said view being taken on the line 5—5 of Figure 3.

Figure 1:
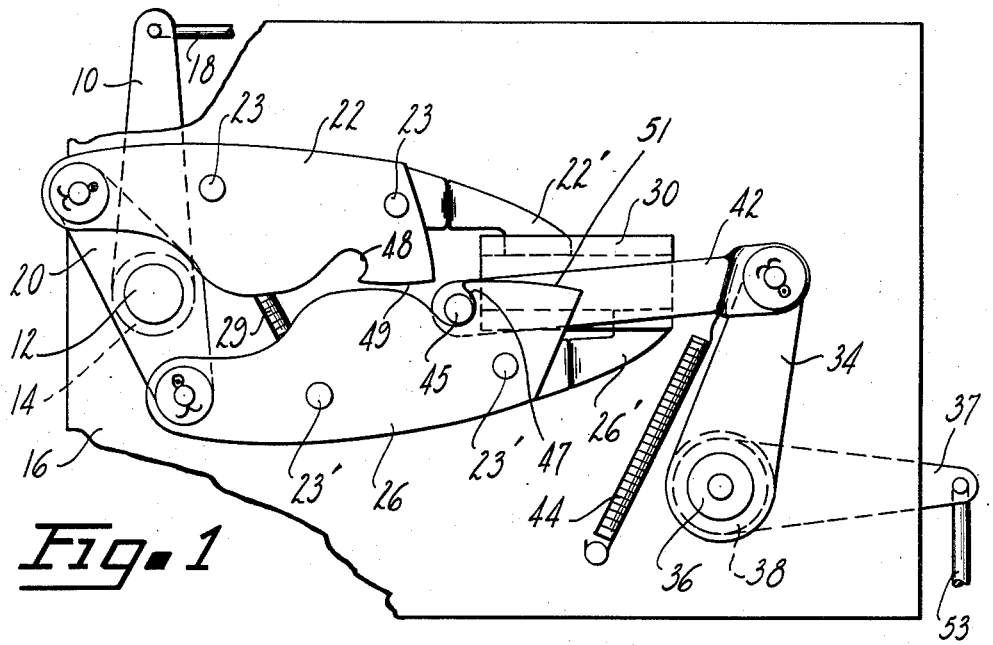
Figure 1 is a view disclosing the parts of the alternator mechanism constituting my invention, the output lever having been moved to one of its two operative positions.

The five figures of the drawings disclose a preferred embodiment of my invention wherein a crank 10, which may be termed an output lever member, extends from and is secured to the outer end of a shaft 12. This shaft 12 is journalled within a sleeve 14 which is preferably permanently secured to a support plate 16. A link 18, pivotally connected to the outer end of the crank 10, is connected to the mechanism to be actuated, such for example, as a transmission operating crank of a change speed transmission mechanism of an automotive vehicle. The output lever member 10 is, by this construction, pivotally mounted on the support plate 16.

To the inner end of the shaft 12, that is, the end lying just within the support plate 16, there is secured a two-armed crank or walking beam 20. To the end of the upper arm of the latter member there is pivotally connected a first alternator leg 22; and as disclosed in Figure 5 said leg preferably comprises two juxtaposed plates secured together by rivets 23. These plates straddle the upper arm of the crank 20 at one end of the leg. To the lower end of the crank 20 there is pivotally connected a second alternator leg 26; and said leg may also be constructed of two juxtaposed plates which straddle the crank 20 at the pivotal connection therewith. A tension spring 29 preferably connected at its ends to one of the rivets 23 and to a rivet 23' interconnecting the two plates of the leg 26, serves to bias the alternator legs 22 and 26 toward each other; and said spring also serves to maintain the end portion of guide members 22' and 26' within a slot provided by a guide plate 30 secured to and spaced from the support plate 16. The guide member 22' is preferably integral with and extends outwardly from one end of the inner plate of the leg 22; and the guide member 26' is preferably integral with and extends outwardly from the inner plate of the leg 26.

A crank 34, which may be termed an input lever member, is secured to the inner end of a shaft 36 and said shaft is preferably journalled within a bearing 38 which is preferably permanently secured to the support plate 16. A link 53 pivotally connected to the end of a crank 37, may be either manually or power operated depending upon the mechanism of which the alternator mechanism of my invention constitutes a part. The crank 37 is mounted on the outer end of the shaft 36. To the upper end of the lever member 34 there is pivotally connected a pawl 42. This pawl, operating as a tension member, is preferably biased to rotate in a counter-clockwise direction, by means of a tension spring 44 connected at its lower end to the support plate 16; and a pin 45, extending laterally from one end of the pawl, is adapted to nest within a recess 47 in the alternator leg 26 and within a recess 48 in the alternator leg 22. As is disclosed in Figure 5 this pin 45 is of a width sufficient to extend across both of the plates of the alternator legs; and it is to be noted that the outer plates of the two alternator legs lie in the same or substantially the same plane and that the inner plates of said legs lie in the same, or substantially the same plane.

The output lever member 10 is disclosed in one of its two operative positions in Figure 1 and the sequence of operations of the alternator mechanism constituting my invention will now be described said description starting with the position of the parts of the mechanism disclosed in this figure. The input lever member 34 is first rotated counterclockwise to the position disclosed in Figure 2; and in effecting this operation the pin 45 is first biased by the spring 44, against the curved upper edge of the spaced apart plates of the leg 26, and then contacts the lower edge of the two plates of the leg member 22 throughout an area indicated by the reference numeral 49. With the latter operation the leg 22 is rotated counterclockwise about its pivoted connection with the crank 20 against the tension of the spring 29. At the end of this operation the parts of the mechanism take the positions disclosed in Figure 2 the leg member 22 snapping back in a clockwise direction, by what may be termed a trigger operation, to the position disclosed in Figure 2, the pin 45 lying within the recess 48.

The mechanism is, by the above described preselecting operation, conditioned to subsequently effect the second setting of the output lever member 10; and the latter operation is effected by rotating the input member 34 clockwise, the parts of the mechanism being moved to the positions disclosed in Figure 3. In this operation the force transmitting pawl 42 and leg 22 serve as tension links to rotate the crank 20 clockwise; and in this operation the guide members 22' and 26' are held in position behind the plate 30 thereby keeping the parts of the mechanism in their proper relative positions. The output lever 10, is, by this operation moved in a clockwise direction and the work connected to the link 18, i. e. a transmission mechanism of an automotive vehicle, is, by this operation, actuated to establish the second setting thereof, the first setting having been established when the alternator mechanism is operated to move the parts thereof to the positions disclosed in Figure 1.

Figure 2:
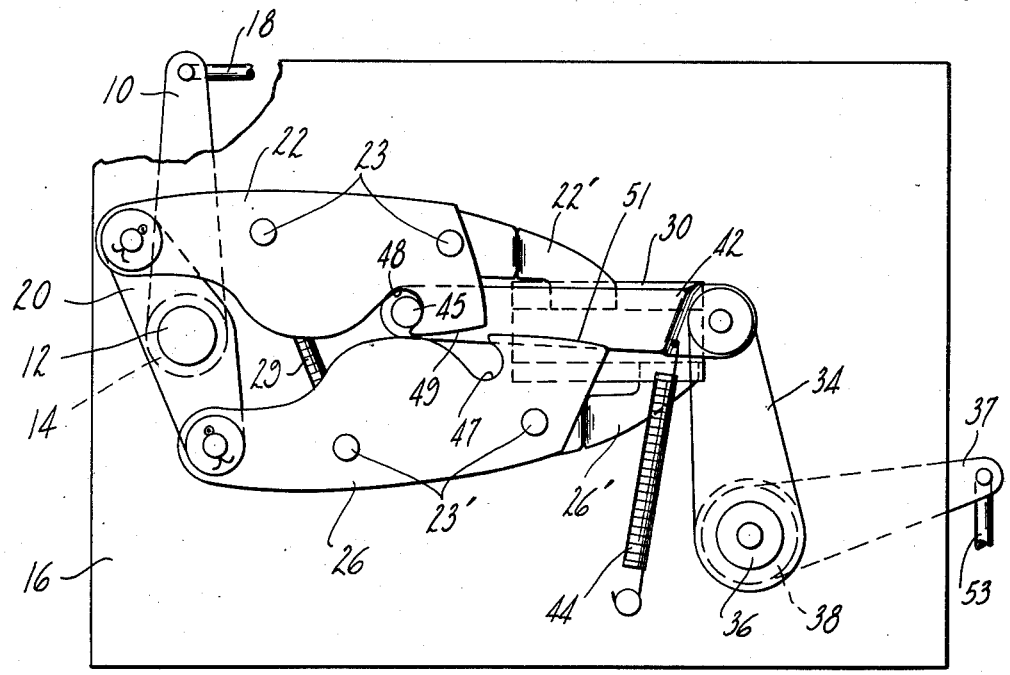
Figure 2 is another view of the parts of the alternator mechanism constituting my invention, the input lever having been moved from the position disclosed in Figure 1 to its position to preselect the next operation of the mechanism.

Concluding the description of the operation of the mechanism constituting my invention, to effect the second pre-selecting operation of the mechanism, that is, prepare the mechanism for an operation to effect the aforementioned Figure 1, that is, first setting of the output lever member 10, the input lever member 34 is again rotated counterclockwise; and with this operation the pin 45 moves along the edge of the alternator leg 22 at 51 until it reaches the recess 47 whereupon it is, by a trigger operation of the spring loaded leg 26 and spring loaded pawl 42 snapped into said recess. In effecting this operation the leg 26 is rotated in a clockwise direction against the tension of the spring 29. The parts of the mechanism are then in the positions disclosed in Figure 4 and the mechanism is ready for a subsequent clockwise rotation of the input lever member 34 to again effect the operation of the output lever member 10.

There is thus provided, by the compact mechanism disclosed in the five figures of the drawings, an alternator or direction changing mechanism well suited for use as a part of the transmission operating mechanism of an automotive vehicle, particularly a transmission operating mechanism including a single acting pressure differential operated motor operative to successively effect two different settings of the transmission.

With the mechanism of my invention, the binding of the parts is reduced to a minimum inasmuch as the alternator legs are kept in alignment throughout the entire operation; furthermore the arrangement and construction of the parts of said mechanism, including the employment of the force transmitting tension members 22, 26 and 42 interconnecting the input and output levers, is such that the bearing loads are reduced to a minimum.

Although only one embodiment of the invention has been illustrated and described, various changes in the form and relative arrangements of the parts may be made to suit requirements.

I claim:

1. An alternator mechanism including as a unit a support plate, an input member pivotally mounted on said plate, an output member pivotally mounted on said plate, a two-armed crank operatively connected to the output member, a two part first alternator leg pivotally connected to one end of the crank, a two part second alternator leg pivotally connected to the other end of the crank, yieldable means operative to bias said leg members toward each other, means operably connected to the input member and alternately connected first with one alternator leg and then the other and operable, with an operation of the input member, to effect an oscillatory angular movement of the crank and the output member connected thereto, and yieldable means connected to the support plate and to the last mentioned means and cooperating with the aforementioned yieldable means to render the mechanism operative for the purpose intended.

2. An alternator mechanism including as a unit a support plate, an angularly movable input member rotatably mounted on said plate, an angularly movable output member rotatably mounted on said plate, a two-armed crank operably connected to said output member, a first alternator leg pivotally connected to one end of the two-armed crank member, a second alternator leg pivotally connected to the other end of the two-armed crank member, guide means, including means mounted on the support plate and means connecting with the alternator legs, for maintaining the alternator legs in the same or substantially the same plane with each other and spaced from the support plate; and a force transmitting tension member interconnecting the input member with one or the other of the alternator legs.

3. An alternator mechanism including as a unit a support plate, an angularly movable input member rotatably mounted on said plate, an angularly movable output member rotatably mounted on said plate, a two armed crank operably connected to said output member, an alternator leg pivotally connected to one end of the two armed crank, a second alternator leg pivotally connected to the other end of the two armed crank, a loaded pawl member interconnecting the input member with one or the other of the alternator legs said pawl member being biased into engagement with one of said legs, a spring for effecting the loading of the pawl member; and spring means connected to the two alternator legs and operative to bias said legs into engagement with one end of the pawl member.

EARL R. PRICE.

REFERENCES CITED

The following references are of record in the file of this patent:

UNITED STATES PATENTS

| Number | Name | Date |
|---|---|---|
| 501,880 | Fraser | July 18, 1893 |
| 1,773,216 | Campbell | Aug. 19, 1930 |
| 2,169,822 | Armstrong | Aug. 15, 1939 |
| 2,327,063 | Randol | Aug. 17, 1943 |

FOREIGN PATENTS

| Number | Country | Date |
|---|---|---|
| 387,311 | Great Britain | 1933 |